US011288375B2

(12) United States Patent
Hanner et al.

(10) Patent No.: US 11,288,375 B2
(45) Date of Patent: Mar. 29, 2022

(54) AUTOMATIC DETECTION OF AN INCOMPLETE STATIC ANALYSIS SECURITY ASSESSMENT

(71) Applicant: International Business Machines Corporation, Armonk, NY (US)

(72) Inventors: Michael Hanner, Kanata (CA); Paul Ionescu, Kanata (CA); Iosif V. Onut, Ottawa (CA); Jeffrey C. Turnham, Newmarket (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 497 days.

(21) Appl. No.: 15/808,937

(22) Filed: Nov. 10, 2017

(65) Prior Publication Data

US 2018/0285572 A1    Oct. 4, 2018

Related U.S. Application Data

(63) Continuation of application No. 15/471,315, filed on Mar. 28, 2017.

(51) Int. Cl.
*G06F 21/57* (2013.01)
*G06F 8/71* (2018.01)
*G06F 8/36* (2018.01)

(52) U.S. Cl.
CPC .............. *G06F 21/577* (2013.01); *G06F 8/36* (2013.01); *G06F 8/71* (2013.01); *G06F 2221/033* (2013.01)

(58) Field of Classification Search
CPC . G06F 21/577; G06F 8/36; G06F 8/71; G06F 2221/033

USPC .......................................................... 726/21
See application file for complete search history.

(56) References Cited

U.S. PATENT DOCUMENTS

| 2006/0161895 | A1 | 7/2006 | Speeter et al. |
| 2008/0147675 | A1 | 8/2008 | Engehausen et al. |
| 2009/0070734 | A1* | 3/2009 | Dixon .............. G06F 8/71 717/102 |

(Continued)

OTHER PUBLICATIONS

List of IBM Patents or Patent Applications Treated as Related; CA920160134US02, Date Filed Nov. 10, 2017, p. 1-2.

(Continued)

*Primary Examiner* — Jeffrey C Pwu
*Assistant Examiner* — Nega Woldemariam
(74) *Attorney, Agent, or Firm* — Cantor Colburn LLP; Jeffrey S LaBaw (57) ABSTRACT

Embodiments include method, systems and computer program products for automatic detection of an incomplete static analysis security assessment. In some embodiments, a method includes obtaining component versioning data associated with a build of an application. The method further includes determining, using the component versioning data associated with the build of the application, that a static analysis security assessment configuration of the application is incomplete. The method further includes, responsive to determining that the static analysis security assessment configuration of the application is incomplete, generating metadata indicating that at least a portion of the build of the application has been changed from a previous build of the application.

7 Claims, 5 Drawing Sheets

(56) References Cited

U.S. PATENT DOCUMENTS

| | | | | |
|---|---|---|---|---|
| 2012/0023553 A1* | 1/2012 | Berg | ............... | G06F 21/577 |
| | | | | 726/4 |
| 2013/0276056 A1* | 10/2013 | Epstein | ............ | G06F 21/604 |
| | | | | 726/1 |
| 2015/0074641 A1* | 3/2015 | Nambiar | ............ | G06F 8/20 |
| | | | | 717/121 |
| 2016/0173573 A1 | 6/2016 | Chan et al. | | |

OTHER PUBLICATIONS

Michael Hanner, et al.,"Automatic Detection of an Incomplete Static Analysis Security Assessment," U.S. Appl. No. 15/471,315, filed Mar. 28, 2017.

\* cited by examiner

AUTOMATIC DETECTION OF AN INCOMPLETE STATIC ANALYSIS SECURITY ASSESSMENT

This application is a continuation of U.S. patent application Ser. No. 15/471,315, entitled "AUTOMATIC DETECTION OF AN INCOMPLETE STATIC ANALYSIS SECURITY ASSESSMENT," filed Mar. 28, 2017, the disclosure of which is incorporated by reference herein in its entirety.

BACKGROUND

The present disclosure relates to data processing, and more specifically, to methods, systems and computer program products for automatic detection of an incomplete static analysis security assessment.

Static analysis testing, also known as static program analysis, is a common practice in software development that enables development teams to determine if their products have security flaws. Static analysis testing can be performed without executing programs. The analysis can be performed on some version of the source code, and/or some form of the object code. Some static analysis tools tests web applications for security vulnerabilities during the developmental process.

SUMMARY

In accordance with embodiments described herein, systems, methods, and computer program products for automatic detection of an incomplete static analysis security assessment are provided. An example method includes obtaining component versioning data associated with a build of an application. The method further includes determining, using the component versioning data associated with the build of the application, that a static analysis security assessment configuration of the application is incomplete. The method further includes, responsive to determining that the static analysis security assessment configuration of the application is incomplete, generating metadata indicating that at least a portion of the build of the application has been changed from a previous build of the application.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for automatic detection of an incomplete static analysis security assessment are provided. The methods and systems described herein utilize information provided by continuous integration tools to automatically mark static analysis assessments incomplete or misconfigured. The continuous integration tools transmit component version data to a static analysis security assessment tool, which uses the component version data to determine whether changes in the source code or object code indicate that the static analysis security assessment configuration is incomplete or misconfigured.

Continuous integration refers to merging the work product of development individuals and/or teams working on different components of an application into a shared code repository. For example, a source control server manages each merger or commitment of work product or code and stores the work product in a source code repository. Depending on the development environment, a continuous integration server initiates a new build version of an application and/or the application's components based on each merger or commitment of work product. Each new build version and corresponding installer is stored in a repository, such as a build product repository. The continuous integration server generates metadata for how to deploy applications and what components to include. This metadata can be used to check scan coverage of an application and detect any vulnerability in scan configurations for applications.

In some examples, a static analysis server receives a notification from the continuous integration server that a new build version was generated. The static analysis server accesses the build product repository to perform static analysis testing on the new build version. Static analysis testing tools identify flaws or vulnerabilities in applications during the development cycle, when developers can address and fix issues without affecting consumers or users. Static analysis testing tools identify scan configurations of a new build version of an application as incomplete for different reasons. Examples of such reasons may include, but are not limited to, portions or components of an application not being scanned (e.g., third-party libraries being omitted), scanning configuration or parameters are inaccurate and lead to misleading results, or rules used for the scan are incomplete.

Traditionally, a manual process is used to determine whether a static analysis security assessment configuration is complete or accurate. In such cases, a person reviews the data scanned by the static analysis tool and checks whether the functionality of the application was considered and tested. The present disclosure describes automated techniques to determine whether a static analysis security assessment configuration is complete and accurate.

The techniques described herein use information provided by continuous integration servers to automatically mark static analysis security assessment configurations as incomplete or misconfigured. By identifying static analysis security assessment configurations associated with an application as incomplete or misconfigured, a new scan can be initiated using an updated static analysis security assessment configuration to ensure that the latest build of an application has been properly scanned.

In some embodiments, the static analysis tool communicates with a source control server. The source control server automatically notifies the static analysis tool of certain changes made to the source code of an application. In some cases, the notification indicates that the existing scan configuration is out of date based on the changes made to the source code. For example, if new folders are added that are not included in existing static analysis configurations or third-party components are updated, a new scan may be necessitated.

Figure 1:
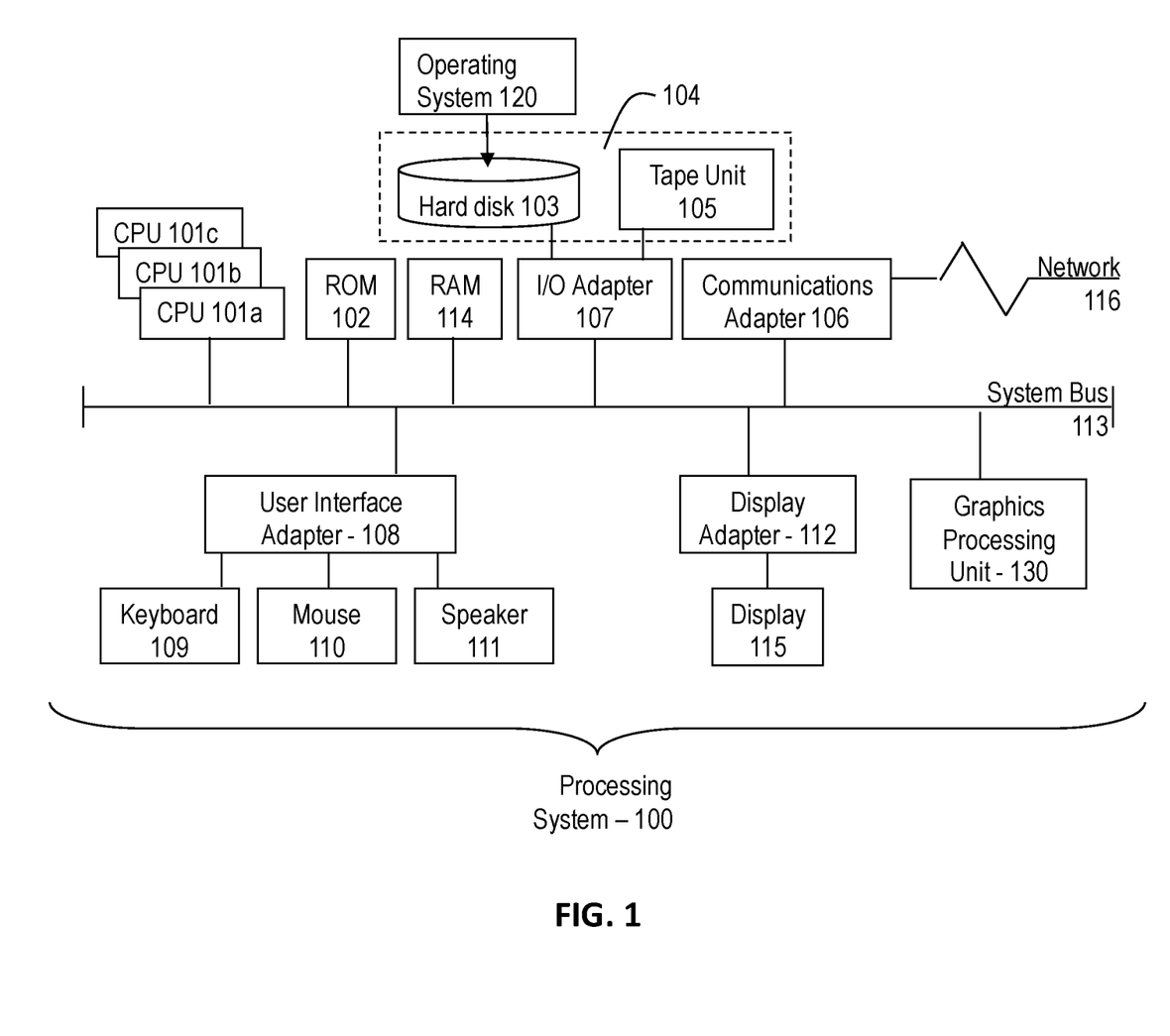
FIG. 1 depicts a block diagram illustrating one example of a processing system for practice of the teachings herein.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are referred collectively to herein as mass storage 104. Operating system 120 for execution on the processing system 100 may be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 are connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
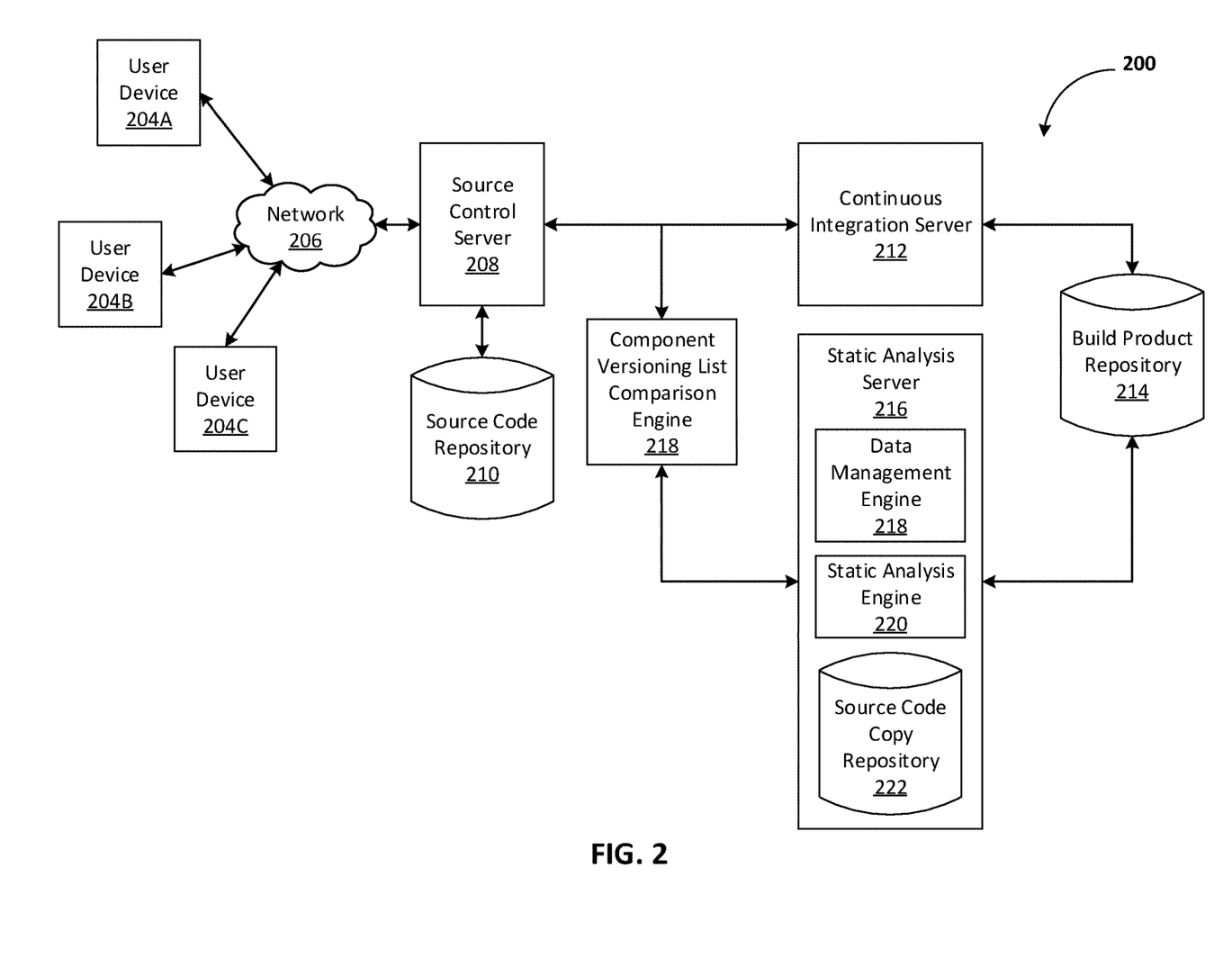
FIG. 2 depicts a block diagram illustrating a computing system in accordance with an exemplary embodiment.

FIG. 2 depicts a computing system 200 in accordance with aspects of the present disclosure. In the example illustrated, the computing system 200 includes user devices 204A, 204B, 204C (collectively referred to as user devices 204), a source control server 208, a source code repository 210, a continuous integration server 212, a build product repository 214, a static analysis server 216, and a component versioning list comparison engine 218 connected via one or more networks 206.

Although depicted as a client-server architecture, in some embodiments, the methods and systems described herein may be implemented using a cloud service architecture. In such implementations, the user device 204, source control server 208, source code repository 210, continuous integration server 212, build product repository 214, and/or static analysis server 216 communicate with functionality provided in a cloud computing environment, such as the cloud computing environment 50 of FIG. 4. Using a cloud computing environment may be useful in situations in which multiple developers or teams of developers work on different components of an application and merge their work product into a shared code repository. For example, the shared code repository may be stored in a cloud computing environment and may be accessed and updated by the various developers or teams of developers working on the application.

The user device 204 executes applications and tools used to develop one or more applications. For example, an application developer uses the user device 204 to write code for a software application. The user device 204 can be any suitable type of computing device, such as a computer, laptop, tablet, smartphone, wearable computing device, server, etc. The user device 204 is capable of communicating with other devices, such as via the networks 206.

The network(s) 206 represents any one or a combination of different types of suitable communications networks such as, for example, cable networks, public networks (e.g., the Internet), private networks, wireless networks, cellular networks, or any other suitable private and/or public networks. Further, the network(s) 206 may have any suitable communication range associated therewith and may include, for example, global networks (e.g., the Internet), metropolitan area networks (MANs), wide area networks (WANs), local area networks (LANs), or personal area networks (PANs). In addition, the network(s) 206 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

In some embodiments, the source control server 208 can be any type of computing device with network access, such as a computer, laptop, server, tablet, smartphone, wearable computing devices, or the like. The source control server 208 creates a component versioning list for tracking changes in computer files and facilitating collaborative work among teams of developers. The source control server 208 manages documents, websites, and/or other collections of information. In some embodiments, the source control server 208 is associated with a source code repository 210. The source code repository stores metadata for a set of files and/or directory structure. Depending on whether the version control system utilized by the source control server 208 is distributed (e.g., in the cloud computing environment 50 of FIG. 4) or centralized, the whole set of information in the source code repository 210 can be duplicated on each user's system or can be maintained on a single server or data store. Examples of the metadata that the source code repository 210 include are a historical record of changes in the repository, a set of commit objects, and/or a set of references to commit objects, called heads.

In some embodiments, the source control server 208 is associated with and/or communicates with a continuous integration server 212. The continuous integration server 212 can be any type of computing device with network access, such as a computer, laptop, server, tablet, smartphone, wearable computing devices, or the like. The continuous integration server 212 receives an indication or notification from the source control server 208 when changes have been made to documents or files associated with the development of an application. The continuous integration server 212 initiates builds of the application using information committed to the source code repository 210. In some embodiments, the continuous integration server 212 schedules builds, initiates builds when other builds have completed, and/or initiates a build by requesting a specific URL. Builds generated by the continuous integration server 212 are stored and/or transmitted to a build product repository 214. The build product repository is accessible by the continuous integration server 212 and/or static analysis server 216.

In some embodiments, the continuous integration server 212 is associated with and/or communicates with the static analysis server 216. The static analysis server 216 can be any type of computing device with network access, such as a computer, laptop, server, tablet, smartphone, wearable computing devices, or the like. In the embodiment of FIG. 2, the static analysis server 216 includes a data management engine 218, a static analysis engine 220, and a source code copy repository 222.

The data management engine 218 includes computer-readable instructions that, in response to execution by the processor(s) 101, cause operations to be performed. Such operations can include tracking data of associated computing devices, such as continuous integration servers 212, source control servers 208, source code repositories 210, build product repositories 214, and the like. The data management engine 218 receives notifications and/or messages from one or more of the entities in the system 200. The data management engine 218 processes the received notifications and/or messages and transmits the data to the static analysis engine 220.

According to embodiments described herein, the static analysis engine 220 includes computer-readable instructions that, in response to execution by the processor(s) 101, cause operations to be performed. Such operations can include receiving data from the data management engine 218. The static analysis engine 220 generates and maintains static analysis security assessment configurations and static analysis security assessments associated with application builds generated by the continuous integrations server 212. The static analysis engine 220 receives data from the continuation integration server 212 that is used to mark a static analysis security assessment configuration associated with an application as incomplete. Marking the configuration incomplete enables an administrator of the system to update the configuration with appropriate parameters to ensure an accurate static analysis security assessment.

In some embodiments, the static analysis engine 220 receives a notification or message from the component versioning list comparison engine 218 indicating specific changes have been made to the source code of an identified application (e.g., libraries have been added, folders have been newly created, etc.). The component versioning list comparison engine 218 compares the source code stored in the source code repository 210 with the source code stored in the source code copy repository engine 222.

The static analysis engine 220 use the data from the notification or message from the component versioning list comparison engine 218 to mark the configuration as incomplete. In some embodiments, the static analysis engine 220 generates a notification to a user of the system to update or modify the configuration accordingly. In some embodiments, the static analysis engine 220 updates or modifies the static analysis security assessment configuration using data generated by the source control server 208 (e.g., via source code repository 210) and/or the continuous integration server 212 (e.g., via build product repository 214). In some embodiments, the static analysis engine 220 initiates a new static analysis security assessment using the updated or modified configuration associated with the application.

Figure 3:
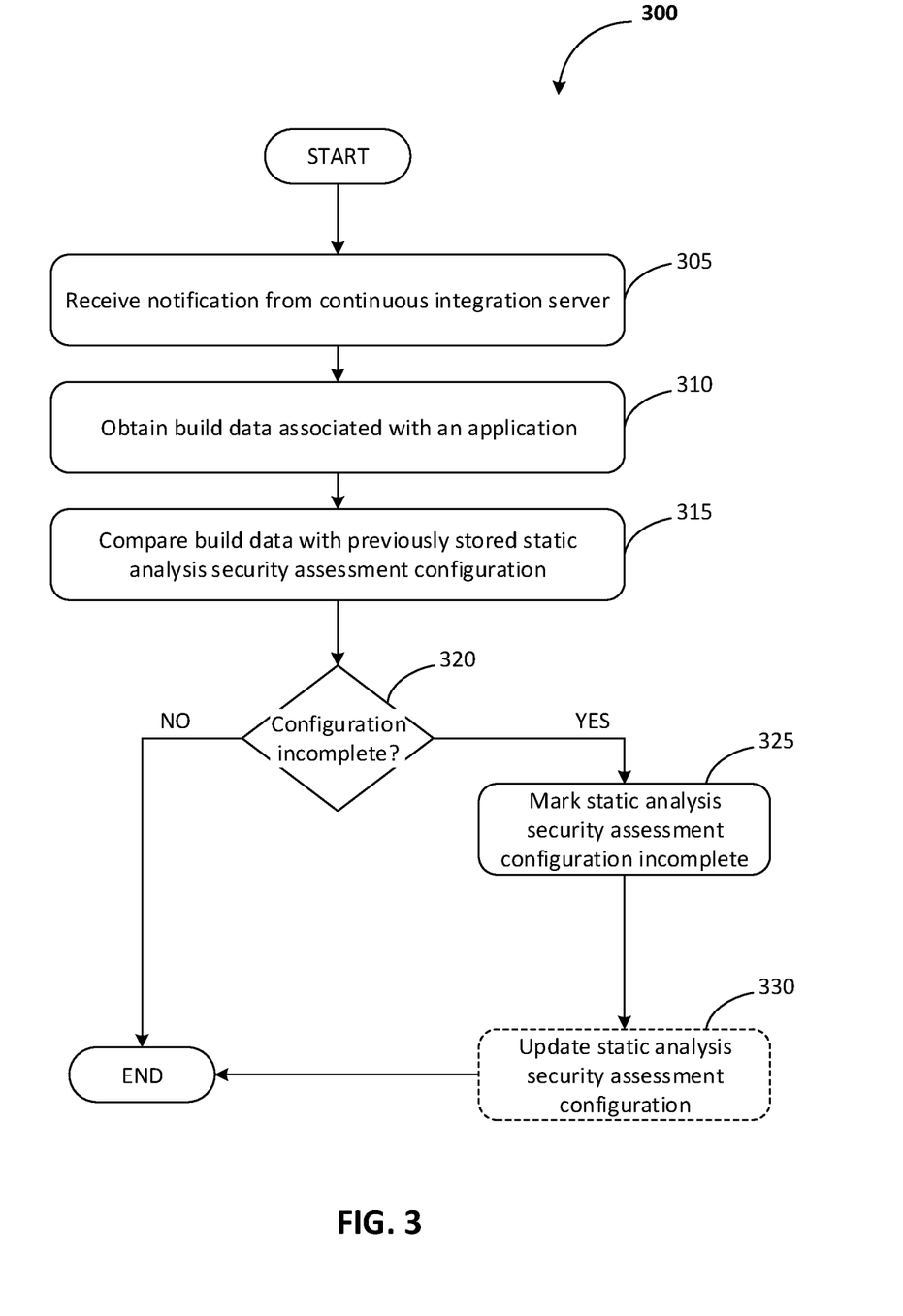
FIG. 3 depicts a flow diagram of a method for automatic detection of an incomplete static analysis security assessment in accordance with an exemplary embodiment.

Now referring to FIG. 3, a flow diagram of a method 300 for automatic detection of an incomplete static analysis security assessment in accordance with an exemplary embodiment is depicted. At block 305, a notification is received from a continuous integration server 212. In some embodiments, the data management engine 218 of the static analysis server 216 receives a notification and/or message from the continuous integration server 212. In some embodiments, the continuous integration server 212 requests a specific URL to notify the static analysis server 216 that a new build is available based on a comparison of the source code stored in the source code repository 210 with the source code stored in the source code copy repository engine 222. In some embodiments, the new build may be available in a build product repository 214.

At block 310, build data associated with an application is obtained. In some embodiments, the data management engine 218 is determined based on the notification and/or message from the component versioning list comparison engine 218, that a new build of an identified application is available. In some embodiments, the notification and/or message may include data associated with the new build of the application. In some embodiments, the data indicates that the application (e.g., new build of the application) includes a new version of a component of the application. In some embodiments, the message and/or notification includes data associated with the new build of the application, such as user device 204 associated with a latest update that initiated the new build, new build identifier, timestamp associated with new build, or the like.

In some embodiments, the data management engine 218 transmits data from the notification and/or message received from the component versioning list comparison engine 218 to the static analysis engine 220. The static analysis engine 220 establishes a connection with the build product repository 214 and obtains data associated with the new build of the application. In some embodiments, the static analysis engine 220 obtains data associated with the new build of the application, generated by the continuous integration server 212 (e.g., metadata associated with the new build). In some embodiments, the static analysis engine 220 uses information from the notification (e.g., new build identification number, timestamp associated with new build, user or user device 204 associated with the new build, or the like).

At block 315, the build data is compared with previously stored static analysis security assessments configurations. In some embodiments, the static analysis engine 220 analyzes the data obtained from the notification from the continuous integration server 212 or obtained from the build product repository 214. The static analysis engine 220 may compare components or versions of components of the application in the new build or installer to a static analysis security assessment configuration associated with the application.

At block 320, it is determined whether the static analysis security assessment configuration is incomplete. If the static analysis engine 220 determines that the static analysis security assessment configuration is complete (e.g., not incomplete), the method terminates.

If, however, the static analysis engine 220 determines that the static analysis security assessment configuration is incomplete, the method proceeds to block 325, where the static analysis engine 220 marks the static analysis security assessment configuration as incomplete. In some embodiments, the static analysis engine 220 generates metadata indicating that the static analysis security assessment configuration is incomplete and associates the metadata with the static analysis security assessment configuration.

In some embodiments, the static analysis engine 220 generates and maintains an application portfolio that includes data associated with multiple applications, such as the applications that are developed by a company. The static analysis engine 220 updates the application portfolio to indicate that the static analysis security assessment configuration for the application is incomplete. In some embodiments, the static analysis engine 220 uses the metadata associated with the application to update the application portfolio.

In some embodiments, the method proceeds to optional block 330. The static analysis engine 220 updates the static analysis security assessment configuration associated with the application. In some embodiments, the static analysis engine 220 updates the configuration using data from the notification from the continuous integration server 212 or the obtained data associated with a new build of the application (e.g., obtained from the build product repository 214).

In some embodiments, the static analysis engine 220 initiates a new static analysis security assessment associated with the application using the data associated with the new build of the application and the updated static analysis security assessment configuration.

In some embodiments, the data management engine 218 receives information from a source control server 208. The information can indicate that a change was made to files associated with the application. The information can further indicate that the change affects an existing static analysis security assessment configuration associated with the application. The data management engine 218 transmits the data to the static analysis engine 220. The static analysis engine 220 initiates, facilitates, or generates an updated static analysis security assessment configuration for the application using the data received from the source control server 208. In some embodiments, the static analysis engine 220 initiates a new static analysis security assessment using the updated scan configuration associated with the application.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
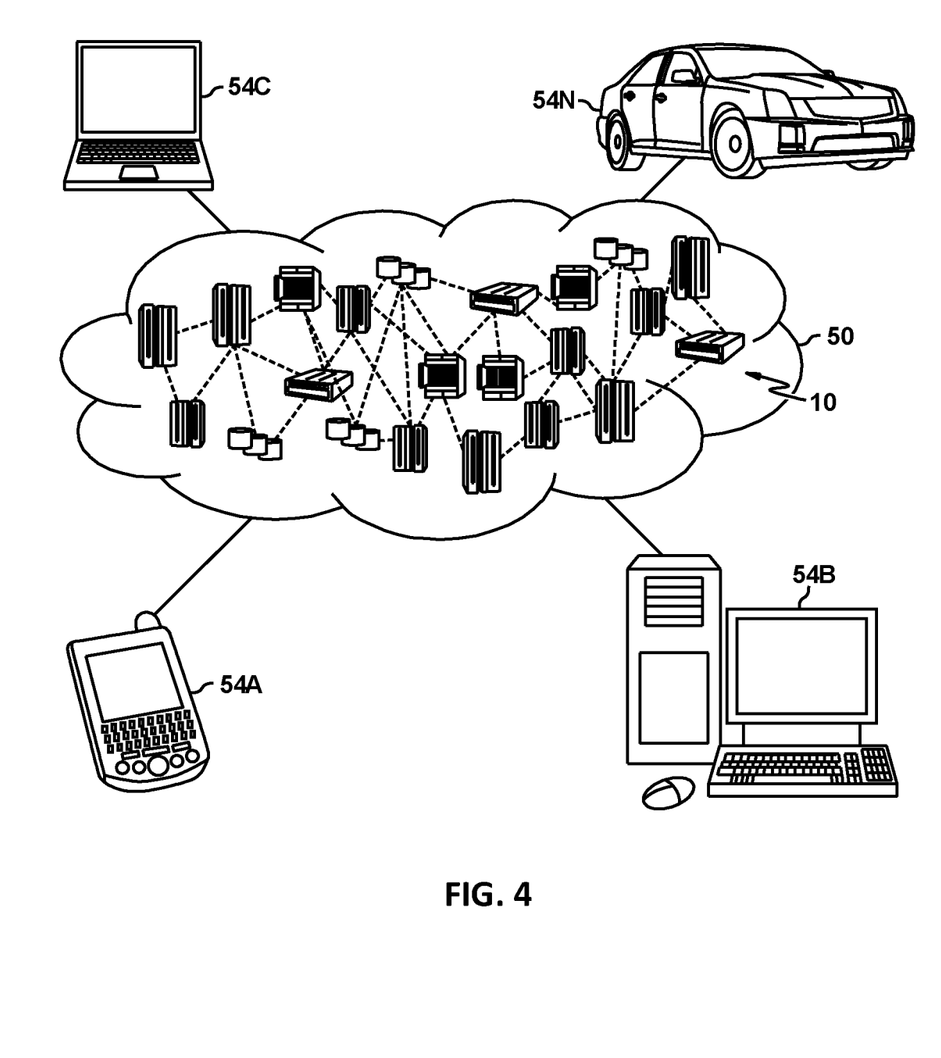
FIG. 4 depicts a cloud computing environment in accordance with an exemplary embodiment.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
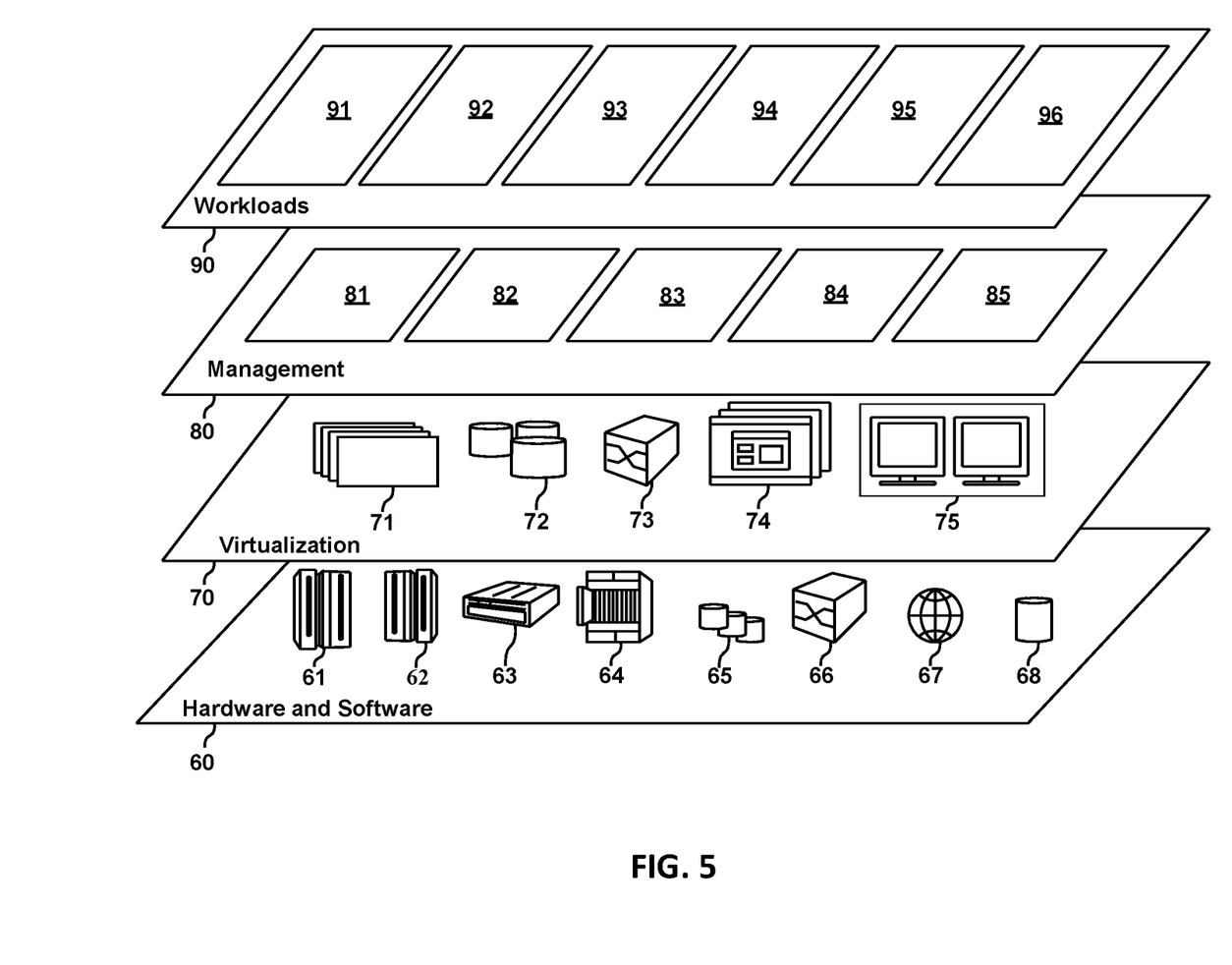
FIG. 5 depicts abstraction model layers in accordance with an exemplary embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic detection of an incomplete static analysis security assessment 96.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for automatic detection of an incomplete static analysis security assessment, the method comprising:
    obtaining component versioning data associated with a build of an application;
    determining, using the component versioning data associated with the build of the application, that a static analysis security assessment configuration of the application is incomplete;
    responsive to determining that the static analysis security assessment configuration of the application is incomplete, generating metadata, wherein the metadata comprises an historical record of changes in a source code repository, a set of commit objects, and a set of references to the commit objects;
    generating an application portfolio comprising a plurality of static analysis security assessment configurations associated with a plurality of applications, wherein the plurality of applications comprises the application; and
    updating the application portfolio using the metadata associated with the application.

2. The computer-implemented method of claim 1, wherein obtaining the data associated with the build of the application further comprises:
    receiving a notification from a continuous integration server that indicates a build of an application has been generated;
    establishing a connection with a build product repository; and
    obtaining the data associated with the build of the application using information from the notification.

3. The computer-implemented method of claim 1, wherein the notification comprises the data associated with the build of the application.

4. The computer-implemented method of claim 1, further comprising:
    initiating a new static analysis security assessment associated with the application using the data associated with the build of the application.

5. The computer-implemented method of claim 1, wherein the data associated with the build of the application indicates that the application comprises an updated version of a component of the application.

6. The computer-implemented method of claim 1, further comprising:
    receiving information from a source control server indicating that a change has been made affecting the static analysis security assessment configuration associated with the application, wherein the change is determined by comparing source code stored in the source code repository with source code stored in a source code copy repository;
    generating an updated static analysis security assessment configuration associated with the application; and
    initiating a new static analysis security assessment using the updated static analysis security assessment configuration associated with the application.

7. The computer-implemented method of claim 1, wherein the metadata indicates that at least a portion of the build of the application has been changed from a previous build of the application.

* * * * *